C. L. GRAHAM.
WIRE FENCE STRETCHER.
APPLICATION FILED NOV. 10, 1909.
973,034.
Patented Oct. 18, 1910.
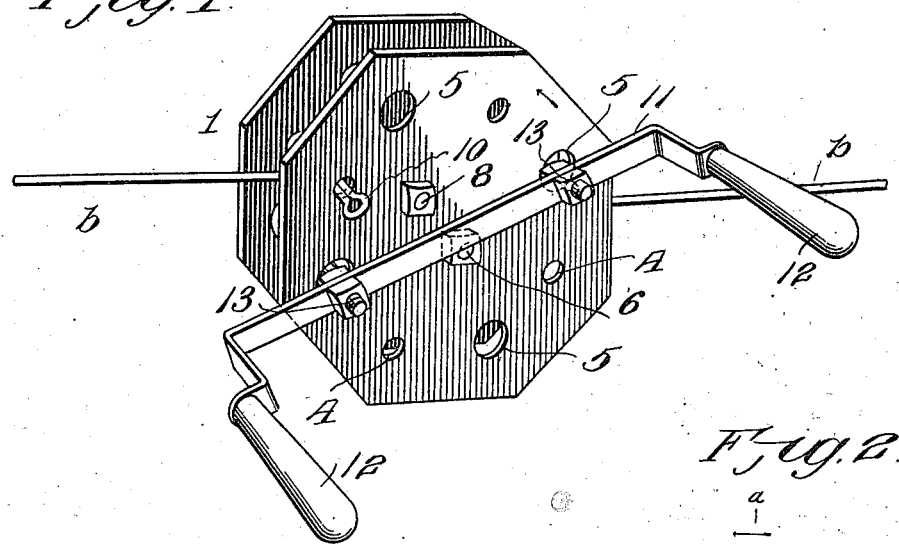
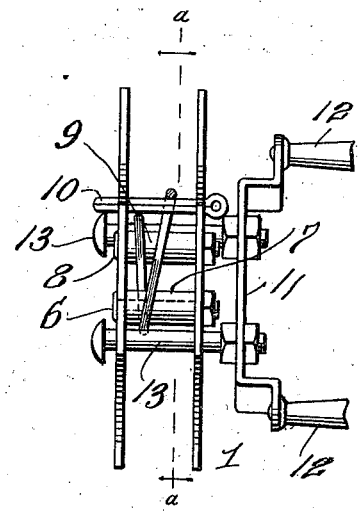
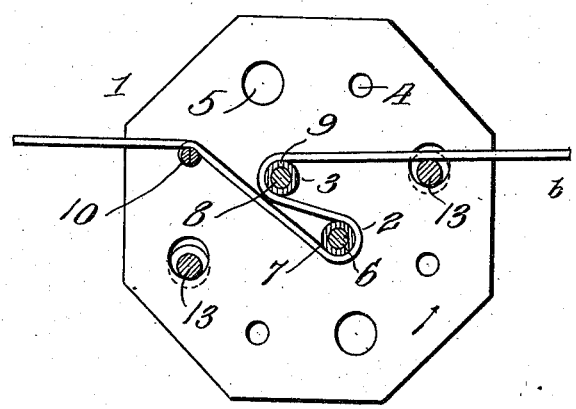
Witnesses
Frank Hough
J. W. Garner
Inventor
Charles L. Graham,
By Victor J. Evans
Attorney

UNITED STATES PATENT OFFICE.

CHARLES L. GRAHAM, OF ASHLEY, NORTH DAKOTA.

WIRE-FENCE STRETCHER.

973,034.   Specification of Letters Patent.   Patented Oct. 18, 1910.

Application filed November 10, 1909. Serial No. 527,257.

*To all whom it may concern:*

Be it known that I, CHARLES L. GRAHAM, a citizen of the United States, residing at Ashley, in the county of McIntosh and State of North Dakota, have invented new and useful Improvements in Wire-Fence Stretchers, of which the following is a specification.

This invention is an improved device for attachment to the wires of wire fences, for taking up the slack therein so as to tighten the same to any desired extent and consists in the construction, combination and arrangement of devices hereinafter described and claimed.

In the accompanying drawings:—Figure 1 is a perspective view of a wire fence stretcher constructed in accordance with my invention, showing the same attached to a fence wire. Fig. 2 is an end elevation of the same. Fig. 3 is a sectional view of the same on the plane indicated by the line *a—a* of Fig. 2.

In the embodiment of my invention, I provide a pair of disks 1 which are preferably made of iron or steel and are of suitable size. The said disks are provided near their centers with openings 2—3 and near their edges with openings 4—5 which are arranged in circles concentric with said disks, the openings 4 alternating with the openings 5 and being of less diameter than said openings 5.

A bolt 6 which engages the openings 2 permanently connects the disks together and is provided with a sleeve 7 the ends of which bear against the inner surfaces of the said disks, said sleeve spacing the disks apart a suitable distance. A similar bolt 8 may be placed in the openings 3 or removed therefrom as may be required and is provided with a sleeve 9 to bear against the opposing sides of the disks, a pin 10 which is here shown as a split pin being inserted in any of the openings 4.

In connection with the stretching device described, I also employ an operating lever which is here shown as a bar 11 having outwardly extending handles 12 at its ends and provided at suitable points between its ends with bolts 13 of such size that they may be inserted through any opposite two of the openings 5 of each disk so as to detachably connect the said lever to the said stretcher, the heads of the bolts being smaller than the openings 5 so that the said bolts may be readily drawn out from said openings 5 to detach the lever from the stretcher.

To use my improved stretcher for taking up the slack in a fence wire *b*, stretch said wire and hold it permanently stretched, the pin 10 and the bolt 8 are first removed from the stretcher and the latter placed astride of the wire so that the bolt 6 engages one side of the wire and the bolt 8 is then replaced so as to engage the opposite side of the wire. The lever is then attached to the stretcher by inserting its bolts 13 in two of the openings 5 and the stretcher is then partly turned as indicated by the arrows in Figs. 1 and 3, thus causing the bolts 6—8 to form bights in the wire and partly take up the slack therein. When one of the bolts 13 comes in contact with the wire, the pin 10 is then inserted in one of the openings 4 to hold the stretcher in place on the wire and maintain its tension and the handle lever is then withdrawn from the stretcher and reapplied by placing its bolts 13 in other openings 5 thereof, the pin 10 is removed and revolution of the stretcher is continued until the requisite quantity of the wire has been wound up between the bolts 6—8, after which the pin 10 is finally inserted so as to bear against one side of the wire, as shown in Fig. 3 and the lever bar then removed, the stretching device being left permanently on the wire. It will be understood that should the wire further slacken at any future time, the slack can be again taken up so that by the use of my improved stretchers the wires of a fence may be kept tight at all times.

Upon particular reference to Fig. 3 of the drawing, it will be observed that the heads of the bolts 13 are operable to bear against one disk of the stretcher when the latter is revolved. By so constructing the just described parts the bolts will be effectively held against casual displacement from the openings and the lever effectively held in its applied position.

Having thus described the invention, what is claimed, is:—

A wire stretcher comprising a pair of disks having openings near their centers and also near their peripheries, connecting and spacer bolts in the center openings of said disks, one of said connecting and spacer bolts being removable from the disks to enable the bolts to be disposed on opposite sides of the wire to be stretched, a lever, headed bolts formed for removable engagement in the outer openings of the disks and formed so that the said headed portions will bear against one disk to hold the bolts in their operative positions, said disks being formed to provide openings which are disposed between the said outer openings, and a pin for insertion in either of the said second named openings and to bear against the wire when stretched so as to retain the wire in stretching position to coact with the spacer and connecting bolts in securing the stretcher on the wire.

In testimony whereof I affix my signature in presence of two witnesses.

CHARLES L. GRAHAM.

Witnesses:
WM. MAERCKLEIN,
W. L. JOHNSON.